United States Patent [19]

Camenzind

[11] 3,786,200

[45] Jan. 15, 1974

[54] AMPLIFIER FOR USE IN COMMUNICATION SYSTEMS

[76] Inventor: Hans R. Camenzind, Santa Clara, Calif.

[22] Filed: May 17, 1972

[21] Appl. No.: 254,059

[52] U.S. Cl. .................................... 179/81 B

[51] Int. Cl. .................................... H04m 1/60

[58] Field of Search ............... 179/1 HF, 1 VC, 1 A, 179/81 B; 307/255; 330/124 D

[56] References Cited

UNITED STATES PATENTS 3,733,441 5/1973 McCorkle ........................ 179/81 B

*Primary Examiner*—Kathleen H. Claffy
*Assistant Examiner*—Alan Faber
*Attorney*—Flehr, Hohbach, Test, Albritton & Herbert

[57] ABSTRACT

An amplifier for use in communication systems in which the output lines supply power to the amplifier which can operate from either polarity of supply voltage which may also be a relatively low voltage. The amplifier receives an input signal and applies the signal to said pair of lines. In one embodiment of the amplifier it can operate at high gain in response to an input signal and low gain in absence of an input signal to provide suppression of background noise. Another embodiment provides control of the amplifier gain as a function of operating current to more closely match the output characteristics of carbon microphones. The amplifier disclosed is particularly suitable for integration into a silicon monolithic bipolar circuit.

11 Claims, 8 Drawing Figures

INVENTOR
HANS R. CAMENZIND

BY

ATTORNEY

VOLTAGE ACROSS TERMINALS OF SYSTEM AT 21,22 (FIGURE 1)

OUTPUT VERSUS INPUT OF SYSTEM

OUTPUT AT TERMINALS, MODE 2

OUTPUT AT TERMINALS, MODE 1

OUTPUT OF CARBON MICROPHONE (PRIOR ART.)

INVENTOR
HANS R. CAMENZIND

INVENTOR
HANS R. CAMENZIND

INVENTOR
HANS R. CAMENZIND

AMPLIFIER FOR USE IN COMMUNICATION SYSTEMS

BACKGROUND OF THE INVENTION

This invention relates generally to amplifiers and more particularly to an amplifier for use in communication systems.

Amplifiers have been described in the prior art that will amplify and condition an electrical signal and provide the output on a pair of wires which also supply the operating power for the amplifier. Where there is a further requirement that the amplifier operate on either polarity of input voltage, the prior art discloses current steering circuitry which takes the form of a bridge circuit comprising four diodes which assure the correct polarity of power supply voltage to the amplifier circuit. The disadvantage of this type of current steering is that there are two diode voltage drops associated with the current steering network which reduce the voltage from the lines to the amplifier. To operate from line voltages as low as 1.5 volts, as frequently encountered in telephone technology, the steering diodes must be fabricated from materials which have a relatively low voltage drop, such as germanium. Even with the use of germanium diodes having relatively low voltage drops in comparison to silicon diodes, the voltage available for the amplifier is extremely low. The design of efficient amplifiers to operate with low power supply voltage is relatively difficult.

It is desirable to fabricate such amplifiers by bipolar monolithic silicon integrated circuit technology. However, the traditional arrangement of current steering circuits makes it almost impossible to integrate the amplifiers in view of the large voltage drops which would occur in silicon steering diodes. At low voltages, encountered as low as 1.5 volts, an integrated circuit amplifier receiving power through a silicon diode steering network would receive only about 0.3 volts making it inoperative.

OBJECTS AND SUMMARY OF THE INVENTION

It is a general object of the present invention to provide an amplifier circuit capable of being formed as a silicon integrated circuit and which can operate from line voltages as low as 1.5 volts.

It is another object of the present invention to provide an amplifier circuit which functions by obtaining operating power from two wire lines to which it supplies signal and which functions down to relatively low line voltages of either polarity with minimum power.

It is another object of the present invention to provide an amplifier circuit which operates at high gain in response to an input signal above a predetermined selected value and operates at low gain in the absence of input signal or an input signal below said preset amplitude.

It is a further object of the present invention to provide an amplifier in which the gain is reduced at low operating currents in a controlled manner.

The foregoing and other objects of the invention are achieved in accordance with the present invention by employing an arrangement of transistors and resistors to comprise a current steering circuit whereby voltage appearing on the pair of wires to which the amplifier output is connected is always connected to the amplifier in the correct polarity to operate the amplifier with minimum voltage drop in the current steering network. A pair of power amplifiers is utilized in the amplifier output, one of which operates at any one time depending on the polarity of the voltage at the amplifier output terminals.

An operational amplifier is used to amplify the relatively low input signal which may be the output from a microphone transducer. This signal is conditioned and applied to the power amplifiers which amplify the signal and apply it to the same pair of wires that supply power to the amplifier. In one embodiment, an automatic gain control amplifier and detector circuit accepts the amplified input signal and determines if it is above or below a preselected amplitude. If it is above a preselected amplitude, a control signal is sent from the circuit to a signal operated attenuator to reduce its attenuation, thus increasing the overall amplifier gain. If the input signal is below a preselected amplitude, the automatic gain control amplifier and detector circuit acts on the signal operated attenuator to reduce the overall amplifier gain.

In one embodiment, a circuit is described which will reduce the current gain of the driver circuit to the power amplifiers as a function of the amplifier output d.c. current. This reduction in current gain results in a lower output at lower currents and is useful in approximating the output current characteristics of carbon microphones.

Another embodiment is described consisting of transistors and resistors whereby with a simple external electrical connection, the aforementioned circuitry may be disabled and the amplifier operated with essentially constant output voltage as a function of current.

DESCRIPTION OF PREFERRED EMBODIMENTS

Figure 1:
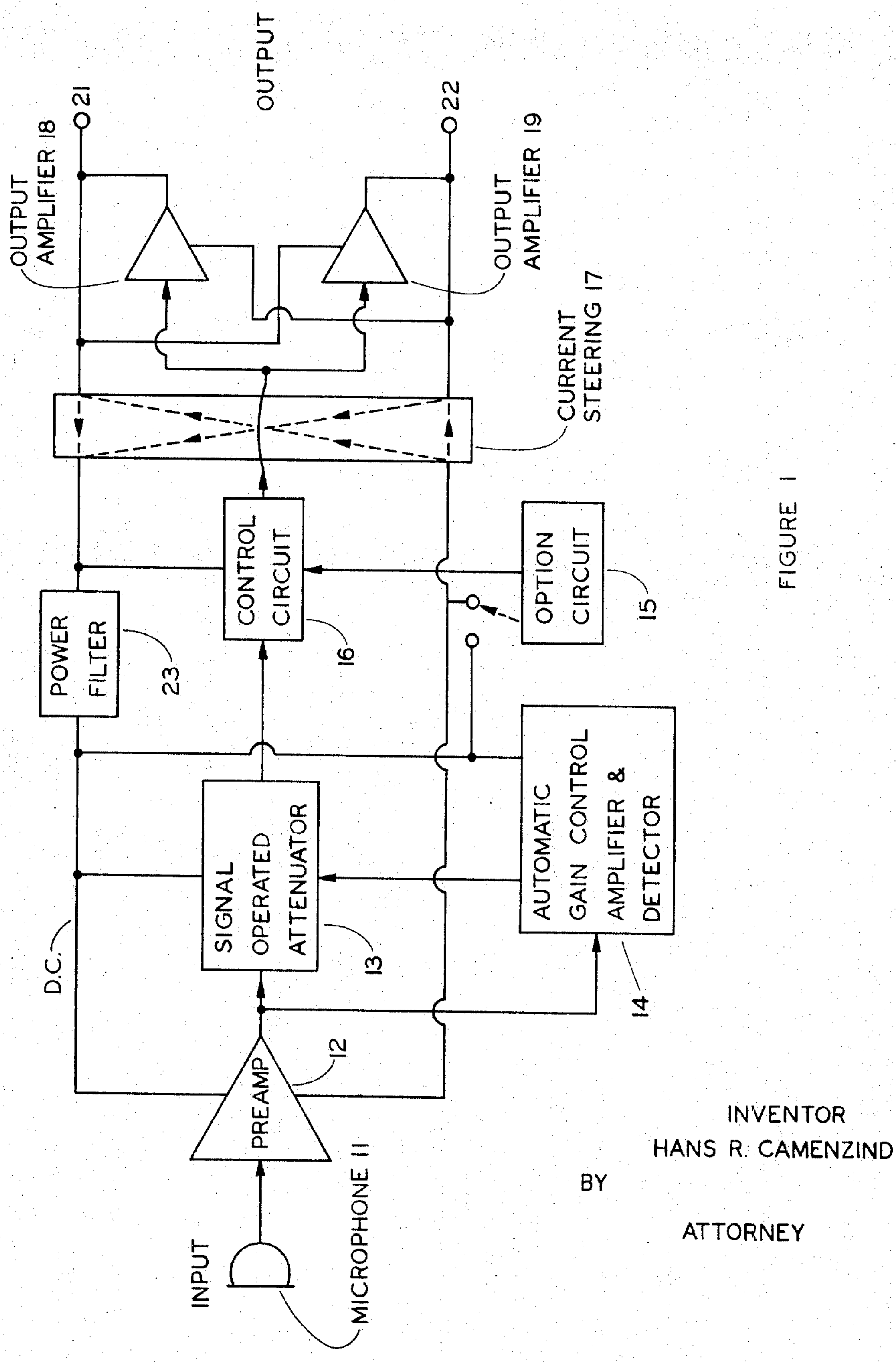
FIG. 1 is a block diagram of an amplifier in accordance with the present invention.

Referring now to the block diagram, FIG. 1, a microphone transducer 11 is connected to the preamplifier 12. The output of the preamplifier 12 is applied through a signal operated attenuator 13 to a control circuit 16. The output of the control circuit is applied to a pair of power amplifiers 18 and 19 which deliver the amplified signal to the lines 21 and 22. The output of the preamplifier is also connected to the input of an automatic gain control amplifier and detector 14 which provides a signal to the attenuator 13 to control its operation for low and high output signals from the preamplifier.

The d.c. voltage appearing at the terminals 21 and 22 is steered by a current steering network 17 so that voltage of one polarity is applied to power the preamplifier 12, attenuator 13, gain control circuitry 14, and control circuitry 16 regardless of the polarity of the voltage at terminals 21 and 22. The power amplifiers 18 and 19 receive power directly from the associated lines. One or the other of the power amplifiers operates depending on the voltage polarity. An important feature of the present invention is that the power required for amplification of the signal need not flow through the steering network as in the prior art. This permits use of a low power steering network.

Figure 4:
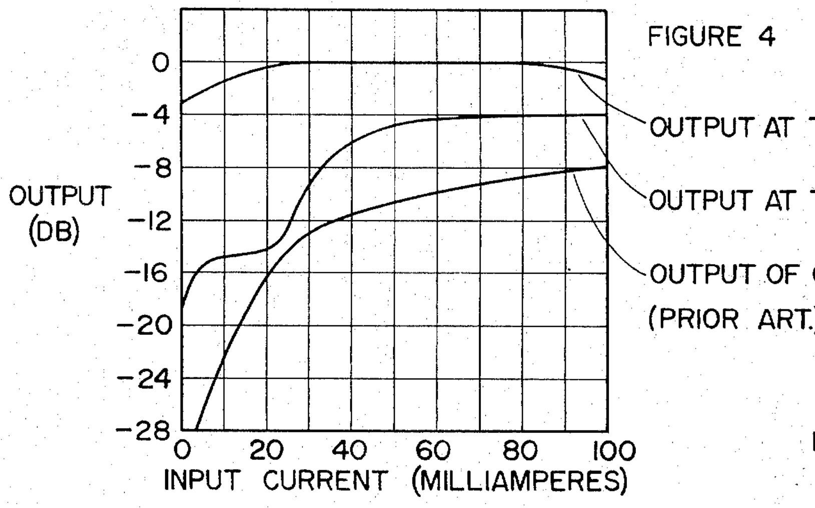
FIG. 4 is a graph showing the output of the amplifier for a given input sound level as a function of supply current.

The control circuitry 16 contains the driver circuitry for the output amplifiers 18 and 19 and the circuitry which adjusts the amplifier gain as a function of operating current to operate on mode 1, FIG. 4, and the circuitry which disables the mode 1 operation and places the amplifier in mode 2 operation.

Figure 5:
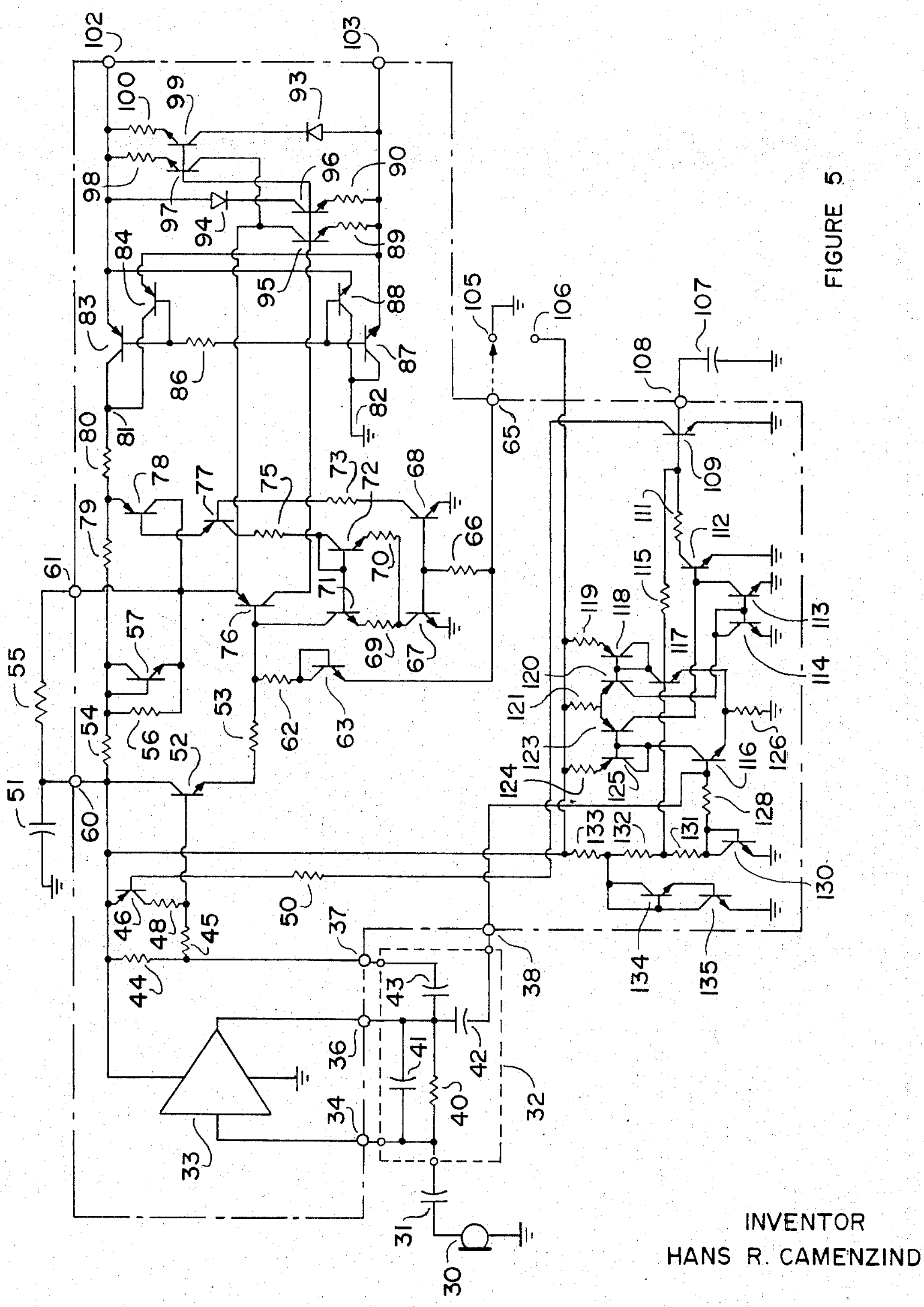
FIG. 5 is a schematic diagram of the preferred embodiment of the invention.

Referring now to FIG. 5, the amplifier is shown connected to a transducer 30 which may be a dynamic or variable reluctance type microphone. The output of the transducer is coupled to the input of preamplifier 33 through a d.c. blocking capacitor 31. Preamplifier 33 is a feedback amplifier which contains a feedback network 32 comprising resistor 40 which sets the amplifier gain and capacitor 41 which provides high frequency roll-off as well as stabilization. The preamplifier may be of a number of designs presently in common usage and, therefore, is only shown in block diagram. The preamplifier used should, however, operate with relatively low supply voltage, as low as one volt. Amplification of the preamplifier is set by a feedback network 32, described above. The output of the preamplifier is typically 100 millivolts, a suitable level for driving the associated circuits to be presently described.

The output of the amplifier 33 is coupled to terminal 37 by d.c. blocking capacitor 43. A signal controlled attenuator consisting of resistors 44, 45, 48 and transistor 46 is connected to terminal 37. The transistor 46 acts as a switch which is driven into saturation by current into the base through the resistor 50. When the transistor 46 is in saturation, an attenuator is then formed by the resistors 45 and 48. The resistor 44 is a biasing resistor whose function is to place the collector of transistor 46 at essentially the same d.c. potential as that of the emitter thereby preventing a d.c. offset signal from being produced when the transistor 46 is driven in and out of conduction.

The transistor 52 is the load for the signal controlled attenuator and because of its very high input impedance does not cause significant loading of the collector of transistor 46 and thus allows switch action without d.c. offset voltages or transient signals.

Resistor 44 is selected to have a high value in comparison to the output impedance of the preamplifier 33 and resistors 44 and 45 are selected to have a low value in comparison to the input impedance of transistor 52 whereby they have little effect upon the a.c. currents flowing through the transistor 52 when transistor 46 is not conducting. The transistor 52 operates as an emitter-follower to transmit or pass signals even though the base voltage may be near the supply voltage at terminal 60 or even higher than the supply voltage.

The AGC amplifier-detector circuit for controlling operation of the attenuator is shown at the bottom of FIG. 5. The attenuator control signal comes from the collector of transistor 109. When this transistor is conducting, collector current will flow and the electrically controlled attenuator will be in the high attenuation condition. When the transistor 109 is off or nonconductive, the attenuator will be in the low attenuation condition.

Transistor 109 is controlled by a current flowing through the resistor 115 from the voltage divider network comprising the resistors 131, 132 and 133 and transistors 130, 134 and 135. The current flows into the timing capacitor 107 charging it when the voltage on capacitor 107 becomes high enough the transistor 109 is turned on. The time constant formed by the resistor 115 and capacitor 107 creates the time delay during which the amplifier is in the high gain condition following a lowering of the input signal below the detection threshold (typically 200 millisecond time delay). This time delay permits the amplifier circuit to be in its high gain condition even during intersyllable intervals.

When transistor 112 is turned on, it draws current through the resistor 111 and discharges capacitor 107 taking the transistor out of conduction and allowing the amplifier gain to quickly rise to the high gain condition, typically an eight millisecond time delay.

Transistors 116 and 117 form a differential amplifier which is deliberately unbalanced by an amount equal to the detection threshold desired. This unbalance is created in such a way that temperature effects as well as resistive variations in the monolithic IC fabrication do not appreciably affect the threshold. Transistors 134 and 135 are connected to form an "ideal" voltage regulator with the voltage at the junction of resistors 132 and 133 equal to two times the base-emitter voltage drop, $2V_{be}$. Transistor 130 provides a voltage $V_{be}$ to resistor 131. The voltage at the common terminal of resistors 131 and 132 is then between $V_{be}$ and $2V_{be}$ dependent upon the ratio of the resistors 131 and 132. This voltage is applied to the base of transistor 117 which is one side of a differential amplifier driving the transistor 112. The base of transistor 116 is supplied with voltage $V_{be}$ from transistor 130 through resistor 128 as well as the input a.c. signal from terminal 38. When the amplitude of these two signals becomes higher than the bias on the base of transistor 117, there is an output from the balanced stage consisting of transistors 116, 117, 118, 120, 123, 125, 114 and 113, and resistors 126, 119, 121, 124 and 128. The output of this amplifier drives transistor 112 into conduction on the positive peaks of the input signal. In the preferred embodiment with the various resistors and transistors suitably selected, the transistor 109 will be switched at an a.c. level of approximately 14 millivolts RMS.

The transistor 76 is the control element which transfers the a.c. signals from the emitter-follower 52 to the output amplifiers. It is controlled by the associated control circuitry to provide either operation in mode 1 or mode 2, FIG. 4.

In mode 1, the bias voltage for the base of transistor 76 is determined by current flowing through transistor 52, resistors 53 and 62 and the voltage drop across diode connected transistor 63. The a.c. signal applied to the base of transistor 76 is applied to the output amplifiers consisting of transistors 95, 96 and 97, 98, respectively. The current gain of the power amplifiers is determined by the ratio of resistors 89, 90 and 98, 100, respectively, and the ratio of the effective emitter area of the transistors 95, 96 and 97, 99, respectively. These amplifiers provide a constant gain to the input current applied to the base of transistors 95 and 97 which is substantially independent of voltage appearing across the lines 102 and 103. Diodes 93 and 94 are provided whereby to prevent application of reverse power to one of the two amplifiers depending upon the polarity of the supply voltage of the output lines 102 and 103. Current gain stability is achieved by connecting the emitter of transistors 76 to the collector of transistors 95 and 97, thereby forming a constant current circuit. However, the circuit will operate satisfactorily by connecting the bases and collectors of transistors 95 and 97 together in a diode configuration and omitting the emitter connection to transistor 76.

Figure 2:
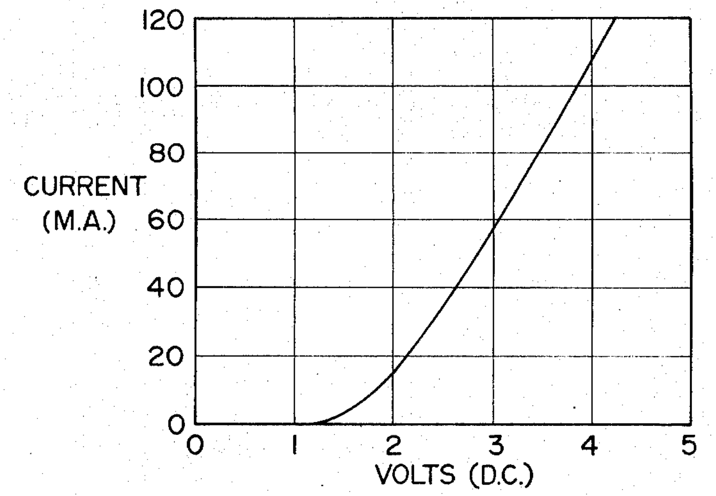
FIG. 2 is a graph showing the output current of the amplifier as a function of voltage.
Figure 3:
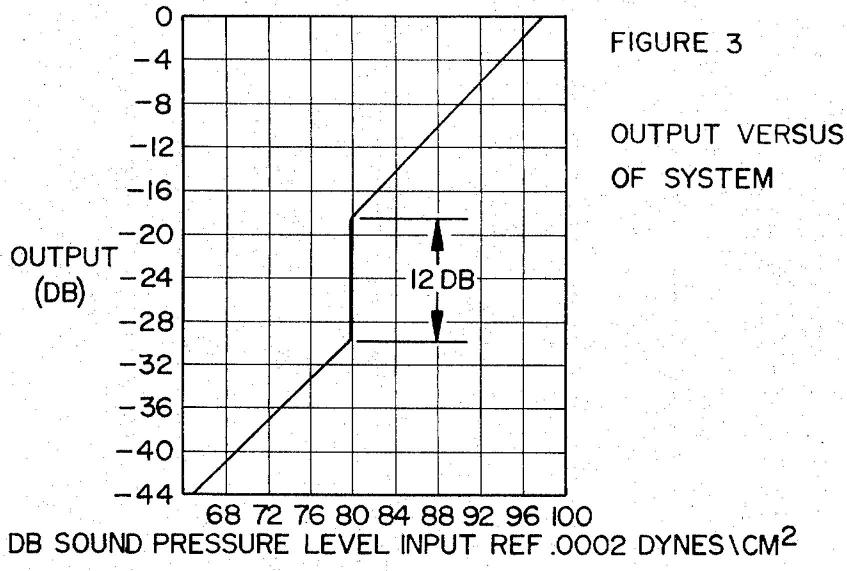
FIG. 3 is a graph showing the response of the amplifier as a function of input sound level in a typical telephone application.

In mode 1 operation, FIG. 4, the gain of the transistors 76 is a function of the resistance in the emitter circuit which is controlled by the network consisting of resistor 56 and transistor 57. At high output current, FIG. 2, the voltage across lines 102 and 103 is high such that the diode connected transistor 57 is conductive which, therefore, reduces the emitter impedance of the transistor 76 and increases its gain. At lower output currents the voltage across lines 102 and 103 is lower, the current through the resistor 56 is reduced whereby the diode connected transistor 57 is turned off. At this point the resistance in the emitter circuit of transistor 76 is comprised of the parallel combination of series resistors 56 and 54 and resistor 55, and as a consequence the current gain of the transistor 76 and the overall amplifier is reduced as shown by the low output step portion of mode 1, FIG. 4.

For operation in mode 2, the terminal 65 is disconnected from ground and connected to terminal 106 which is the positive voltage supply. The positive voltage turns on the transistors 67 and 68. When transistor 68 is turned on, a current path is provided from the positive supply line to ground through the transistors 77 and 78 and resistor 73. Transistor 78 goes into saturation and causes the emitter of transistor 76 to bypass the control element consisting of resistors 56 and diode connected transistor 57. Current flowing through the saturated transistor 77 also flows through the resistor 75, through diode connected transistor 72 and transistor 67. Current also flows through transistors 71 and 67 to ground. By ratioing of the resistors 69 and 70, a current flows in the base of transistor 76 which is in proportion to the current flowing in diode connected transistor 72. By selecting an appropriate current from the collector of transistor 71, the output of the amplifier is substantially constant and is at a higher output level as shown in mode 2, FIG. 4.

Another feature of the present invention is the steering network 17, FIG. 1, which provides a power supply voltage of one polarity to the filter 23 which feeds d.c. voltage to preamplifier 12, signal operated attenuator 13, control circuit 16 and the automatic gain control amplifier-detector circuit 14. The steering network 17, FIG. 1, provides positive supply voltage to filter 23, including capacitor 51, regardless of the polarity of the voltage applied to the input terminals 21 and 22.

Referring to FIG. 5, in operation, assuming that the voltage on terminal 102 is positive with respect to the voltage on terminal 103, the voltage appearing at terminal 102 also appears at the emitter of transistor 83 and causes current to flow through the emitter-base junction of transistor 83, through resistor 86, through the base-emitter junction of transistor 87, and to terminal 103. The current flowing through the resistor 86 biases the transistors 83 and 87 into saturation whereby the emitter and collector of each transistor 83 and 87 are at substantially the same voltage and the voltage at terminal 102 essentially appears at terminal 81, and the voltage at terminal 103 essentially appears at ground point 82, and the terminal 103 is connected to ground 82.

Operation of the circuit for a negative voltage on terminal 102 and a positive voltage on terminal 103 is to provide an emitter-base current through transistor 84, through resistor 86 and through base-emitter junction of transistor 88. The transistors 84 and 88 are then placed in saturation and the voltage at terminal 103 is essentially the same as point 81, and the voltage on terminal 102 is essentially the same as point 82. It is observed that the circuit will operate with voltages across terminals 102 and 103 slightly greater than the emitter-base diode voltage drops of the pair of transistors. With silicon transistors, this drop will be in the order of 1.2 volts through the two transistors plus the small voltage drop across the resistor 86 at low output voltages. When the steering circuit operates, the voltage appearing at the terminals 102 and 103 is essentially applied to the associated filters and amplifiers thereby permitting operation of these circuits with voltages on the terminals 102 and 103 in the order of the supply voltage which may be as low as 1.5 volts.

There exists a leakage path in the steering circuit which, in operation, is as follows: With a positive voltage on terminal 102 and a negative voltage on terminal 103, transistors 83 and 87 will be conducting. There is a positive voltage on point 81 with respect to terminal 103, and the leakage path consists of current flow from point 81 through transistor 84 to terminal 103. Transistor 84 is in the reversed connection for this leakage path whereby the collector becomes the emitter and the emitter becomes the collector. The voltage that tends to make this transistor 84 conduct is the base-emitter voltage of transistor 83 less the small voltage of the saturated collector circuit of transistor 83. The voltage between base and emitter of transistor 84 causes base current to flow which is amplified by the reverse-current-gain of transistor 84 to comprise the leakage current.

A similar leakage path can be shown to exist through transistor 88 by the mechanisms described for transistor 83, said leakage path is from terminal 102 through transistor 88 to ground point 82. Similarly, when the voltage of terminal 102 is negative and terminal 103 is positive, the conducting transistors of the steering network are transistors 84 and 88 and the leakage paths are through transistors 83 and 87.

The means to keep these leakage currents below a level where they will not affect operation of the circuitry is to fabricate the transistors 83, 84, 87, 88 of the steering circuit such that the reverse connected current-gain is very low. If this reverse connected current-gain is kept below typically 1.5, then the circuit leakage will have minimal effect on operation. In integrated circuit technology, the use of low resistivity epitaxial layers of the order of one ohm-centimeter resistivity assists in keeping the reverse connected current-gain of fabricated transistors below 1.5.

Figure 8:
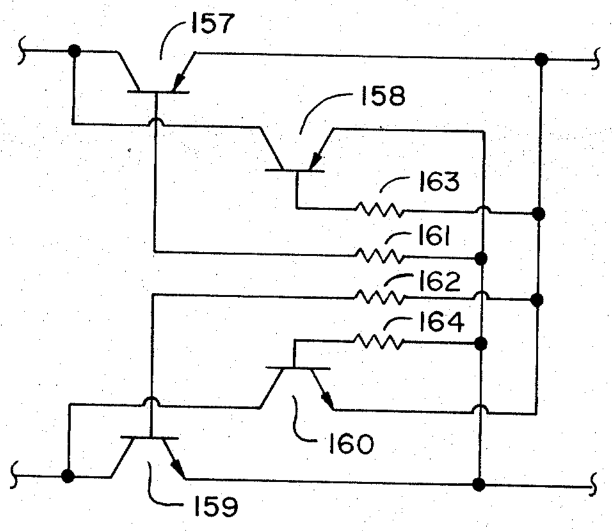
FIG. 8 is a schematic diagram of still another arrangement of a current steering circuit for use in the amplifier.
Figure 7:
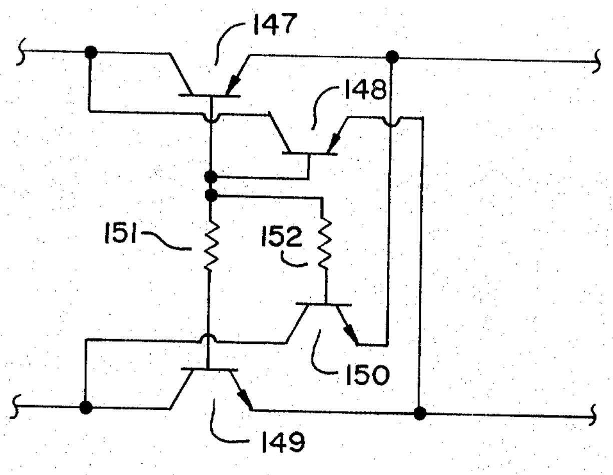
FIG. 7 is a schematic diagram of still another arrangement of a current steering circuit for use in the amplifier.
Figure 6:
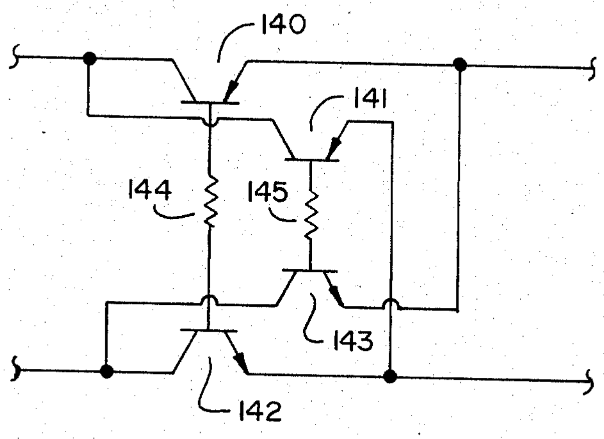
FIG. 6 is a schematic diagram of another arrangement of the current steering circuit for use in the amplifier.

FIGS. 6, 7 and 8 show minor variations of the current-steering circuit. In FIG. 6, there is a separate resistor (144, 145) for each of the pairs of transistors active at a time in the current steering function. This arrangement functions similar to the preferred embodiment, FIG. 5, but usually exhibits more "leakage" than the preferred circuit shown.

In FIG. 7, there is a separate resistor (151, 152) for each of the NPN transistors 149 and 150, and the bases of transistors 147 and 148 are tied together. This arrangement is essentially identical in operation to the preferred embodiment and may have application under conditions where there are voltage transients on the output lines and it is desirable to reduce the resulting current in transistors 149 and 150.

In FIG. 8, the base current drive for each of the steering transistors 157, 158, 159 and 160 blows through a separate resistor to the line opposite the line the transistors are in. This arrangement eliminates the leakage problem discussed previously but requires four resistors which take up more space in an integrated circuit array.

I claim:

1. An amplifier for use in communication systems of the type in which d.c. power is supplied to the amplifier from the communication lines to which the amplifier delivers its output comprising signal processing circuit means for receiving and processing an input signal to provide a processed signal, first and second output amplifiers each connected each to receive and amplify the processed signal and each apply their output to said communication lines, said first output amplifier connected to said output lines to receive power therefrom and operate when voltage of one polarity appears across said lines and being inoperative when a voltage of the other polarity appears across said lines and said second output amplifier being connected to operate when voltage of the other polarity appears across said lines and being inoperative when voltage of one polarity appears across said lines, and steering means connected between said communication lines and said signal processing means to apply voltage of predetermined polarity to said signal processing means regardless of whether the voltage which appears across said lines is of one or the other polarity.

2. An amplifier as in claim 1 in which said signal processing means includes a pair of terminals connected to receive the line voltage and said steering means comprises a first NPN transistor having its emitter connected to one of said communication lines and a second NPN transistor having its emitter connected to the other communication line with the collectors of said first and second NPN transistors connected to one terminal of the signal processing circuit, a first PNP transistor having its emitter connected to the other communication line and a second PNP transistor having its emitter terminal connected to the one communication line with the collectors of said first and second PNP transistors connected to the other terminal of the signal processing network, and means interconnecting the bases of said first transistors and of said second transistors.

3. An amplifier as in claim 2 wherein a plurality of resistances interconnect the bases of the transistors.

4. An amplifier as in claim 2 wherein each of the bases of the current steering transistors is connected through resistance means to the opposite line than that to which the emitter of said transistors is connected.

5. An amplifier as in claim 1 in which the first and second output amplifiers each comprise a first transistor having its base connected to receive the processed signal and providing a substantially constant current source, and a second transistor connected to receive the processed signal and having its emitter and collector connected across said communication lines to amplify and apply the signal to the communication lines with the second transistor of each amplifier having its collector and emitter connected to opposite communication lines.

6. An amplifier as in claim 5 including a diode connected in series with the collector of said second transistor to prevent application of power to one of the two transistors depending upon the polarity of the supply voltage on the communication lines.

7. An amplifier as in claim 1 wherein said signal processing circuit includes a preamplifier adapted to receive and amplify the input signal, a signal controlled attenuator connected to receive the output of said preamplifier, a control circuit connected to said attenuator and providing its output to said first and second output amplifiers, and an amplifier-detector having an input connected to receive the preamplifier output signal and having its output connected to said signal controlled attenuator to control said attenuator to reduce the attenuation when the preamplifier output signal applied to the amplifier-detector circuit input is above a predetermined amplitude.

8. An amplifier as in claim 7 in which said signal operated attenuator comprises first and second series connected resistors in the emitter-collector path of a transistor connected to receive the output of the preamplifier, said control circuit being connected to the common terminal of said resistors, said amplifier-detector connected to the base of said transistor to turn it on when the input signal is below said predetermined amplitude and turn it off when the input signal is above said predetermined amplitude, said resistors acting as a voltage divider to attenuate the signal applied to said control circuit when the transistor is on.

9. An amplifier as in claim 7 in which said control circuit includes a transistor having its base connected to receive signal from said signal controlled attenuator and its collector connected to apply signal to output amplifiers each comprising transistors having base, emitter and collector electrodes, the emitter electrodes of said amplifiers being connected to a resistance network, means for reducing the resistance of said network when the output current from the amplifiers is high to increase the gain and increasing the resistance of said network to decrease the gain when the output current is low.

10. An amplifier as in claim 7 wherein said control circuit includes a transistor having its base terminal connected to receive the output of said signal controlled attenuator and having its output connected to the output of said output amplifiers together with circuit means connected to said transistor for providing a substantially constant output as a function of current to said output amplifiers.

11. An amplifier as in claim 7 wherein said amplifier-detector comprises means for deriving reference voltages, a differential amplifier connected to said means and to receive the output signal from the preamplifier which is unbalanced until the preamplifier signal reaches a predetermined amplitude, a control transistor connected to said signal controlled attenuator, and means connected to the output of said differential amplifier for controlling said control transistor whereby the same is conducting when the amplifier is unbalanced to attenuate the signal.

* * * * *

PO-1050
(5/69)

UNITED STATES PATENT OFFICE
CERTIFICATE OF CORRECTION

Patent No. 3,786,200 Dated January 15, 1974

Inventor(s) Hans R. Camenzind

It is certified that error appears in the above-identified patent and that said Letters Patent are hereby corrected as shown below:

First page, insert as follows:

[73] Assignee: Plantronics, Inc.
Santa Cruz, California

Signed and sealed this 14th day of May 1974.

(SEAL)
Attest:

EDWARD M.FLETCHER,JR.
Attesting Officer

C. MARSHALL DANN
Commissioner of Patents